US009098394B2

(12) United States Patent  
Uejima

(10) Patent No.: US 9,098,394 B2
(45) Date of Patent: Aug. 4, 2015

(54) INFORMATION DISPLAY APPARATUS, INFORMATION DISPLAY METHOD, AND STORAGE MEDIUM STORING PROGRAM FOR DISPLAYING INFORMATION

(75) Inventor: Hiroshi Uejima, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 106 days.

(21) Appl. No.: 13/334,985

(22) Filed: Dec. 22, 2011

(65) Prior Publication Data

US 2012/0162063 A1 Jun. 28, 2012

(30) Foreign Application Priority Data

Dec. 24, 2010 (JP) ................. 2010-286951

(51) Int. Cl.
*G06F 15/02* (2006.01)
*G06K 9/00* (2006.01)
*G09B 5/02* (2006.01)

(52) U.S. Cl.
CPC .............. *G06F 15/0225* (2013.01); *G06K 9/00* (2013.01); *G09B 5/02* (2013.01)

(58) Field of Classification Search
USPC .......................................................... 345/156
See application file for complete search history.

(56) References Cited

U.S. PATENT DOCUMENTS

| 4,987,412 | A * | 1/1991 | Vaitekunas et al. ............ 345/635 |
| 6,514,081 | B1 * | 2/2003 | Mengoli ....................... 434/252 |
| 7,587,065 | B2 * | 9/2009 | Matsumoto et al. .......... 382/103 |
| 8,616,989 | B2 * | 12/2013 | Bentley ......................... 473/215 |
| 2001/0005208 | A1 * | 6/2001 | Minami et al. ................. 345/474 |
| 2006/0150091 | A1 * | 7/2006 | Suzuki et al. .................. 715/517 |
| 2006/0231011 | A1 * | 10/2006 | Kamimura et al. ........... 116/28.1 |
| 2006/0252541 | A1 * | 11/2006 | Zalewski et al. ................ 463/36 |
| 2007/0013719 | A1 * | 1/2007 | Yamamoto ..................... 345/629 |
| 2009/0270169 | A1 | 10/2009 | Kondo |
| 2009/0304234 | A1 * | 12/2009 | Kondo et al. .................. 382/103 |
| 2010/0030021 | A1 * | 2/2010 | Minai et al. .................... 600/109 |
| 2010/0104256 | A1 * | 4/2010 | Tsurumi .......................... 386/69 |
| 2010/0259538 | A1 * | 10/2010 | Park et al. ...................... 345/419 |

FOREIGN PATENT DOCUMENTS

| GB | 1915-8739 A | 6/1916 |
| JP | 2003-131655 A | 5/2003 |
| JP | 2003131655 A * | 5/2003 ............... G09G 5/36 |

OTHER PUBLICATIONS

Extended European Search Report (EESR) dated May 15, 2012 (in English) in counterpart European Application No. 11194224.9.

* cited by examiner

*Primary Examiner* — Waseem Moorad
*Assistant Examiner* — Sujit Shah
(74) *Attorney, Agent, or Firm* — Holtz, Holtz, Goodman & Chick PC

(57) ABSTRACT

An information display method, includes inputting a designated point in each of the series of image data items of the image file, which is sequentially designated as the analysis target point by a user's manipulation, every time each of the series of image data items of the image file is sequentially displayed on the display screen, displaying each of the series of designated points, which are sequentially input, at each input position, sequentially displaying each of the series of image data items stored in the designated image file along with each of the series of designated points while each of the series of designated points is displayed, and displaying a designated point after a change in a display mode different from that of a designated point before the change, every time a transition direction of each of the series of designated points changes.

6 Claims, 12 Drawing Sheets

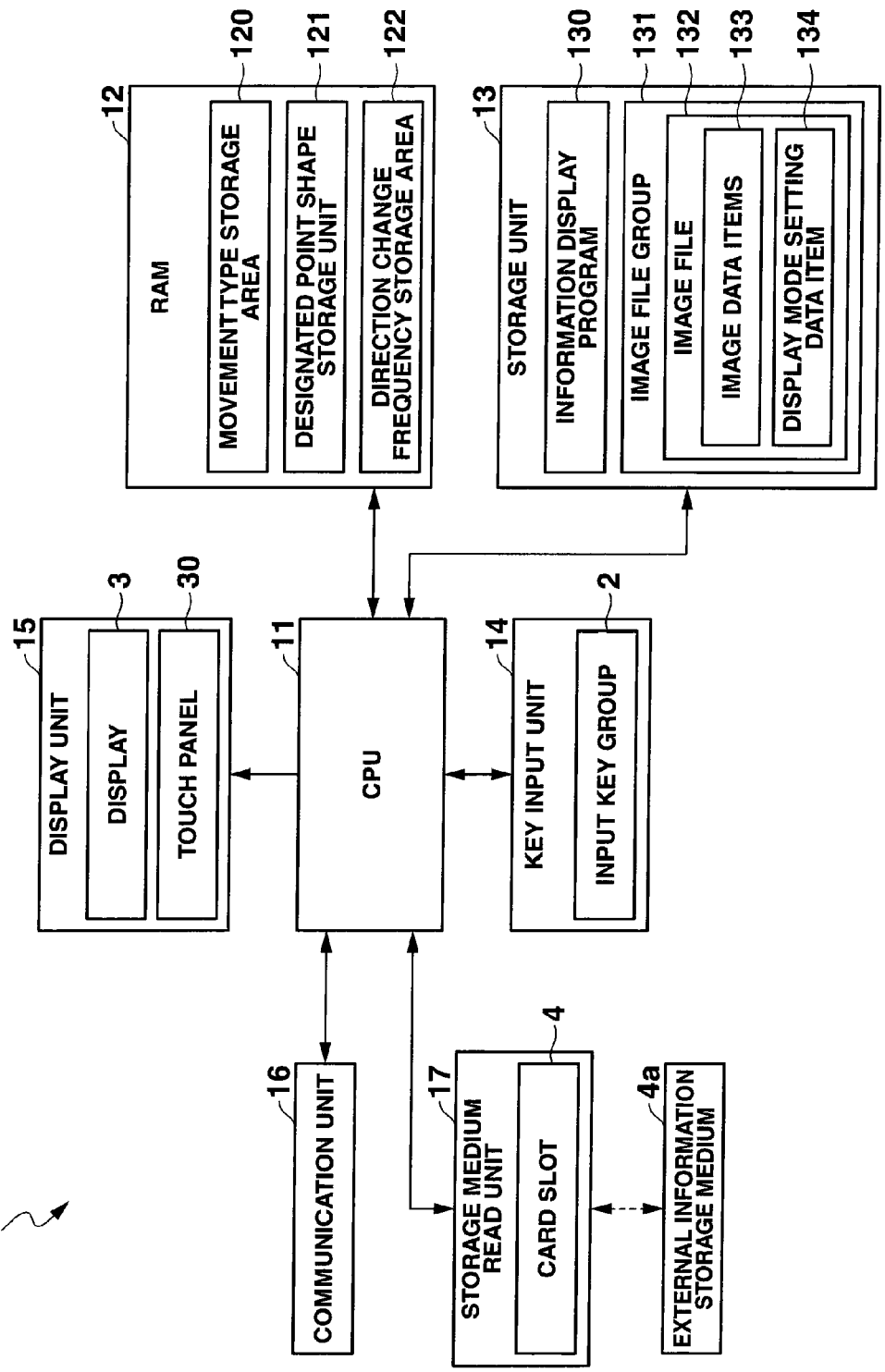

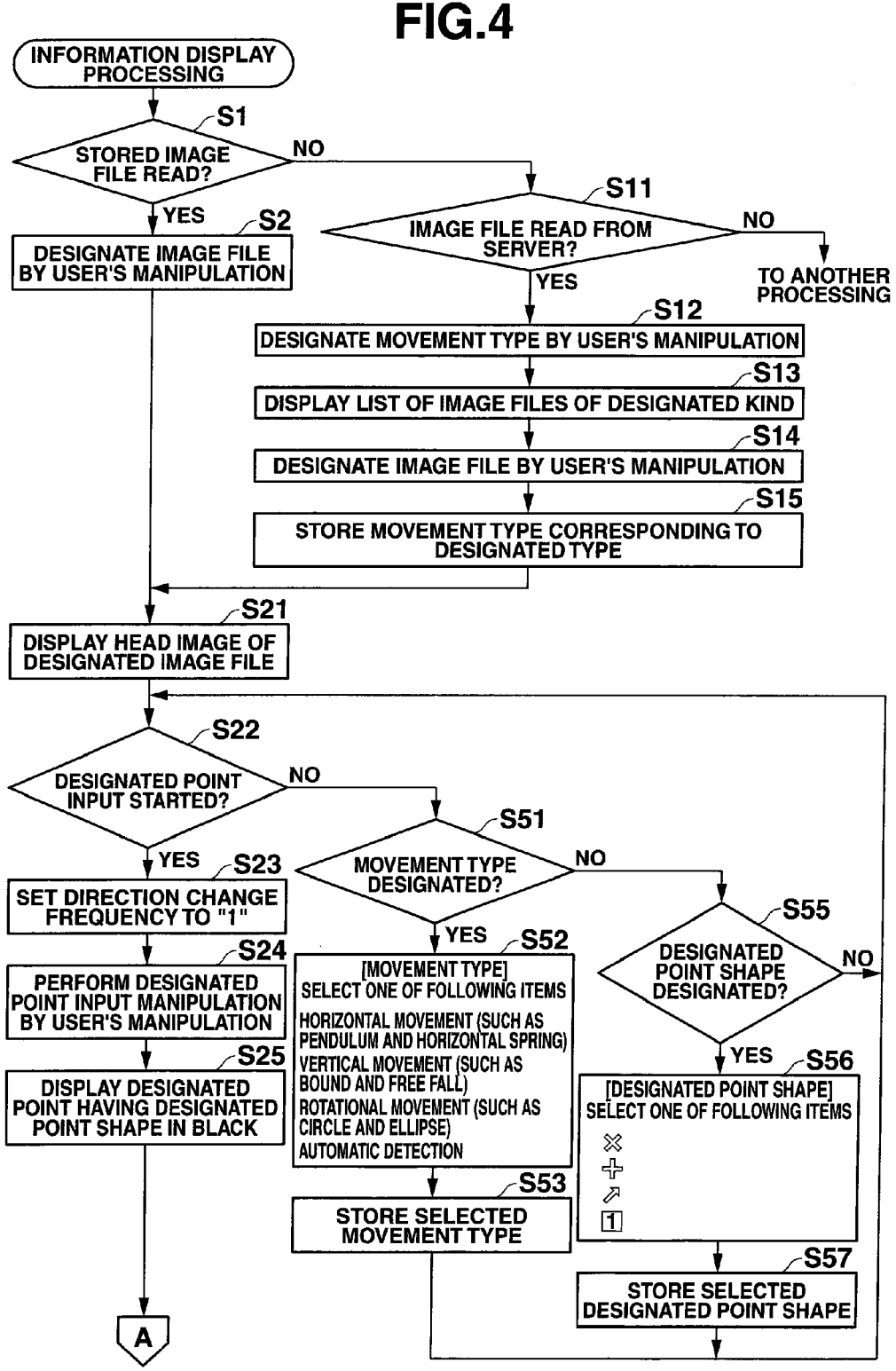

1

INFORMATION DISPLAY APPARATUS, INFORMATION DISPLAY METHOD, AND STORAGE MEDIUM STORING PROGRAM FOR DISPLAYING INFORMATION

CROSS-REFERENCE TO RELATED APPLICATIONS

This application is based upon and claims the benefit of priority from prior Japanese Patent Application No. 2010-286951, filed Dec. 24, 2010, the entire contents of which are incorporated herein by reference.

BACKGROUND OF THE INVENTION

1. Field of the Invention

The present invention relates to an information display apparatus, an information display method, and a storage medium storing a program for displaying information, in which a point designated by a user is displayed with respect to a series of images including analysis target points of a moving object and the analysis target points of the images.

2. Description of the Related Art

Conventionally, in the information display apparatus that displays a graph of a function expression, an image can be displayed in a background in order that a learning effect is enhanced by correlating an event in a real life and graph contents with each other. More particularly, in the information display apparatus, a series of images illustrating a state of a movement of an object is stored while correlated with the graph. When a user designates one point on the graph, the image that illustrates the object moving to the designated position is displayed in the background.

As to a learning method for correlating the event in the real life and the graph contents with each other, contrary to the above procedure, it is conceivable that object positions in each of the series of images is designated with a pen and a designated point is displayed at each designated position to draw the series of designated points that are of analysis target points of the moving object.

However, when the object position in each image is simply designated to draw the series of designated points, the designated points overlap each other in a movement in which the object passes through the same position a plurality of times like a pendulum movement, a movement destination of the designated point is hardly recognized.

BRIEF SUMMARY OF THE INVENTION

Accordingly, it is an object of the invention to provide an information display apparatus, an information display method, and a storage medium storing a program for displaying information, capable of facilitating visualization of the movement destination of the designated point.

According to one aspect of the present invention, there is provided an information display apparatus comprising: an image file storage unit configured to store an image file including a series of image data items containing an analysis target point of a moving object; an image display control unit configured to sequentially display each of the series of image data items of the image file stored in the image file storage unit on a display screen; a designated point input unit configured to input a designated point in each of the series of image data items of the image file, which is sequentially designated as the analysis target point by a user's manipulation, every time each of the series of image data items of the image file is sequentially displayed on the display screen by the image display control unit; a designated point display control unit configured to display each of the series of designated points, which are sequentially input by the designated point input unit, at each input position; and an image switching display control unit configured to sequentially display each of the series of image data items stored in the designated image file along with each of the series of designated points while each of the series of designated points is displayed by the designated point display control unit, the designated point display control unit including a designated point display mode control unit configured to display a designated point after a change in a display mode different from that of a designated point before the change, every time a transition direction of each of the series of designated points changes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram illustrating a functional configuration of the scientific electronic calculator;

FIG. 4 is a flowchart illustrating a flow of information display processing;

DETAILED DESCRIPTION OF THE INVENTION

Hereinafter, an embodiment of the invention will be described in detail with reference to the accompanying drawings. However, the invention is not limited to the illustrated embodiment.

[1.1 Appearance Configuration]

Figure 1:
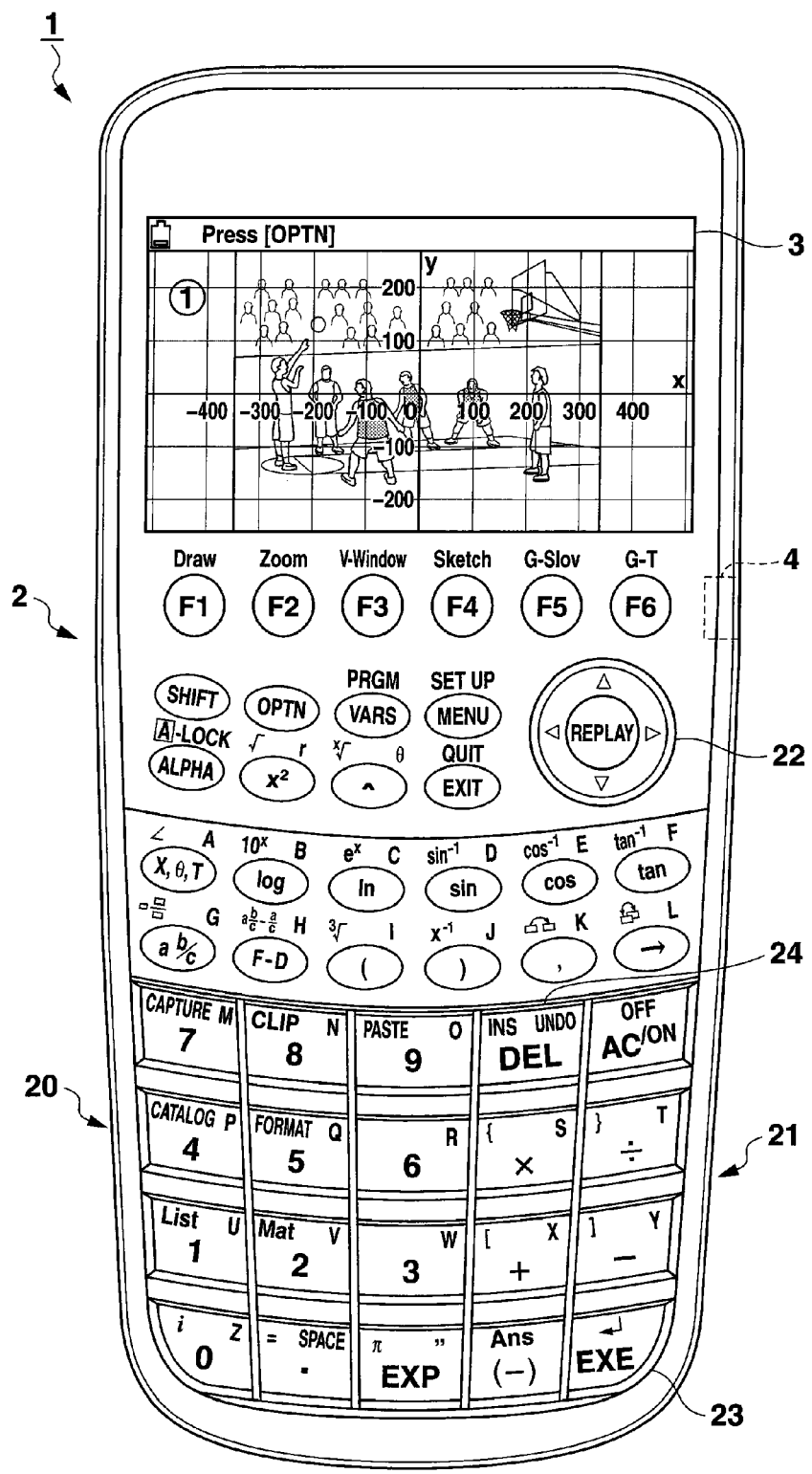
FIG. 1 is a plan view illustrating a schematic configuration of a scientific electronic calculator.

FIG. 1 is a plan view illustrating a schematic configuration of a scientific electronic calculator 1 to which an electronic device according to the invention is applied.

As illustrated in FIG. 1, the scientific electronic calculator 1 includes an input key group 2 provided with various key groups, a display 3, and a card slot 4.

The input key group 2 receives input manipulations of numerical expression elements such as a numerical value and an operator or instruction manipulations of various items of processing from a user. The input key group 2 includes a plurality of keys, and a unique function is allocated to each of the keys. In the embodiment, the input key group 2 includes a numerical keypad 20, an operator key 21, a cursor key 22, an EXE key 23, a delete key 24, and the like.

The numerical keypad 20 receives the input manipulation of the numerical value. The operator key 21 receives the input manipulation of various operators such as symbols of four arithmetic operations, a parenthesis, a vinculum of a fraction, a root sign ($\sqrt{}$), a logarithmic sign, constant (such as a circumference ratio "$\pi$" and a light speed "c"), and signs of trigonometric function.

The cursor key 22 is pressed when a cursor illustrating an edit target position or a selected target position is moved in a predetermined direction in the display 3. In the embodiment, the cursor key 22 is configured to be able to input the four directions of the right, left, top, and bottom.

The EXE key 23 receives a processing execution instruction or an input manipulation of a fixing instruction. For example, the EXE key 23 acts as a key that issues an instruction to execute arithmetic processing after the numerical formula is input. The delete key 24 receives a delete manipulation of the numerical value or the operator, which is displayed on the display 3.

The display 3 is constructed by a liquid crystal display (LCD) or an electronic luminescent display (ELD). The display 3 displays not only a character, a sign, a numerical formula, an arithmetic result according to the manipulation of the input key group 2, but also various data items necessary to use the scientific electronic calculator 1. In the display 3 of the embodiment, a plurality of layers can be displayed while overlapping one another. In the display 3 of the embodiment, a touch panel 30 is integrally provided over a whole surface of a display screen.

The card slot 4 is provided such that an external information storage medium 4a (FIG. 2) in which various information items are stored can detachably attached thereto.

[1.2 Functional Configuration]

A functional configuration of the scientific electronic calculator 1 will be described below.

FIG. 2 is a block diagram illustrating the schematic functional configuration of the scientific electronic calculator 1.

As illustrated in FIG. 2, the scientific electronic calculator 1 includes a key input unit 14, a display unit 15, a communication unit 16, a storage medium read unit 17, a storage unit 13, a random access memory (RAM) 12, and a central processing unit (CPU) 11.

The key input unit 14 includes the input key group 2, and outputs a manipulation signal corresponding to the pressed key to the CPU 11.

The display unit 15 includes the display 3, and displays the various information items on the display 3 in response to a display signal from the CPU 11. The display unit 15 includes the touch panel 30 that is integral with the display 3, and the display unit 15 outputs contact position information on an input pen with respect to the display screen to the CPU 11.

The communication unit 16 can be connected to the Internet. Therefore, the communication unit 16 can conduct communication with an external device connected to the Internet.

The storage medium read unit 17 includes the card slot 4, and reads information from an external information storage medium 4a mounted on the card slot 4 or records the information in the external information storage medium 4a.

At this point, for example, an image file 132 downloaded through the communication unit 16 is stored in the external information storage medium 4a. Because the image file 132 has the same data structure as an image file 132 of the storage unit 13, the description is omitted.

The storage unit 13 is a nonvolatile memory constructed by a read only memory (ROM), and various programs and various data items are stored in the storage unit 13. Specifically, an information display program 130 that is of a program according to the invention and an image file group 131 are stored in the storage unit 13.

Figure 5:
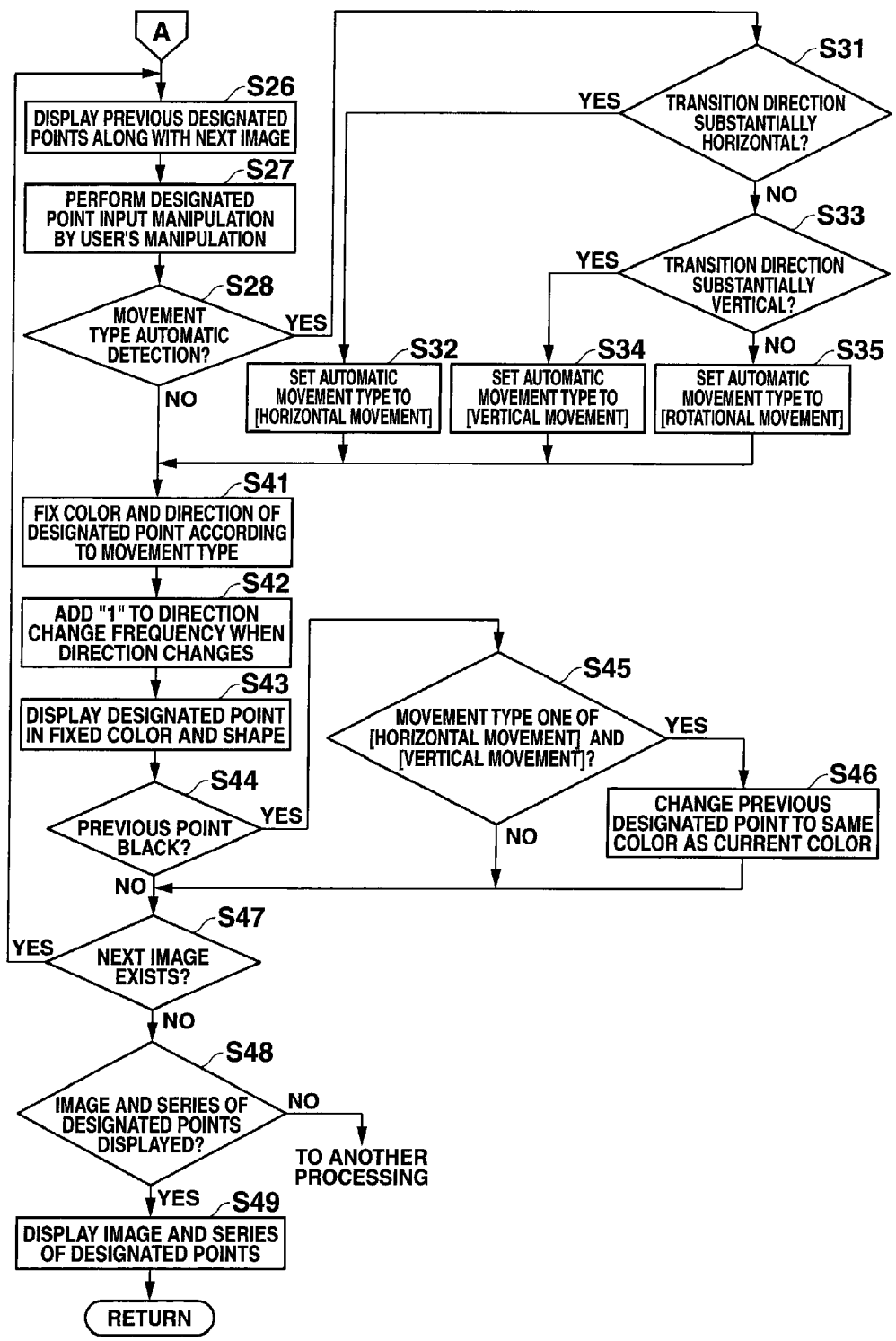
FIG. 5 is a flowchart illustrating the flow of the information display processing.

The information display program 130 causes the CPU 11 to execute information display processing (FIGS. 4 to 5).

The image file group 131 includes a plurality of image files 132, and each image file 132 includes a plurality of image data items 133 and display mode setting data item 134.

Figure 3B:
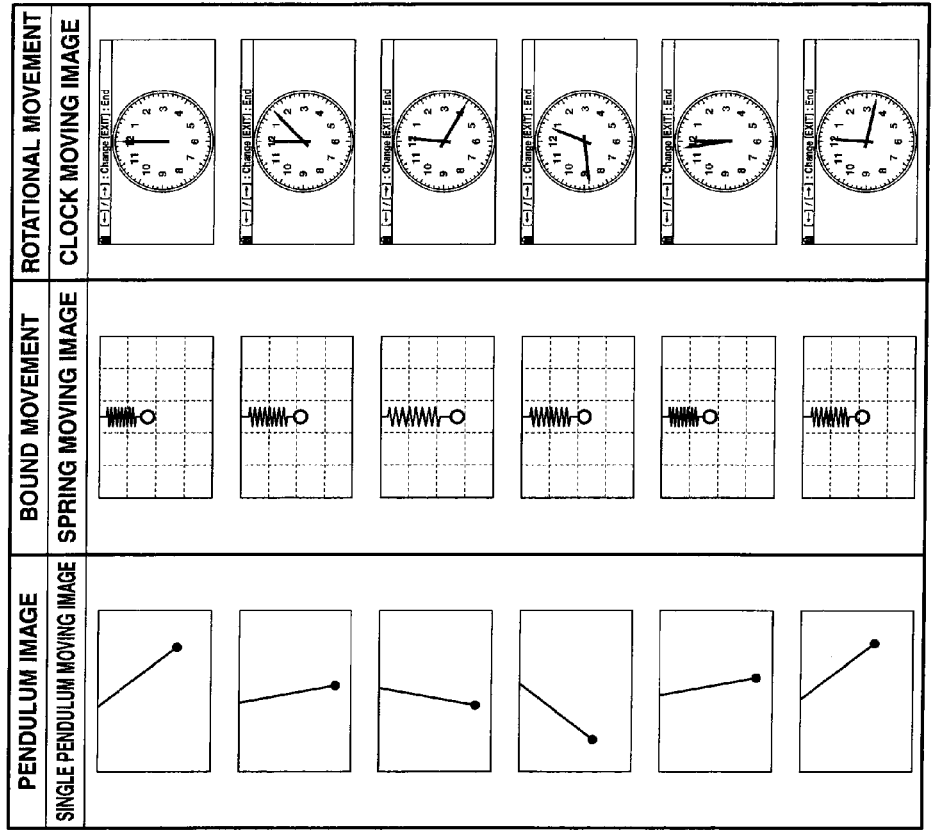
FIGS. 3A and 3B are views illustrating image examples of image files.
Figure 3A:
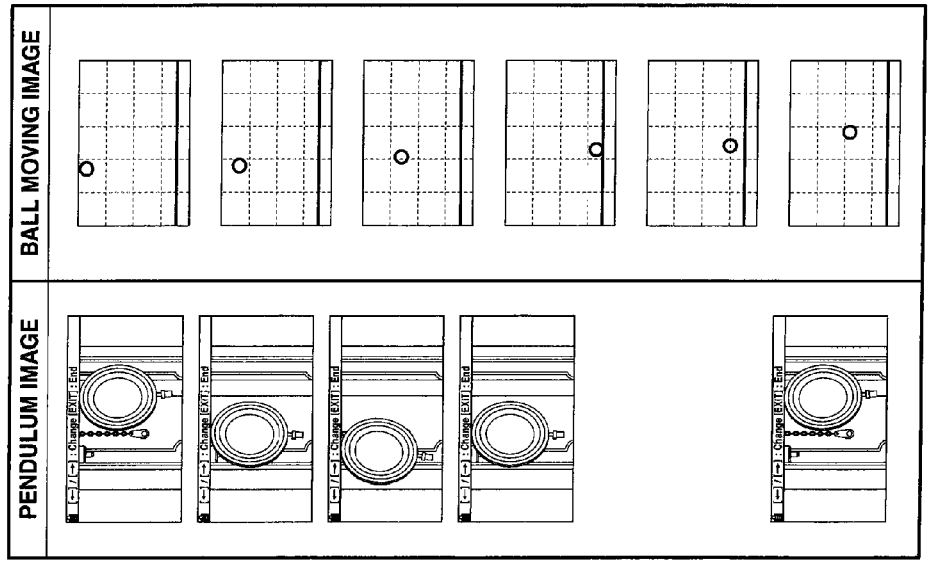

The image data items 133 correspond to images that can be displayed while overlapping a coordinate system, and the image data items 133 express a predetermined shape (such as a parabola and a straight line) that can be approximated by a graph. More particularly, the image data items 133 correspond to images in which a moving object such as a ball and a pendulum is continuously captured as illustrated in FIG. 3A, for example, and the image data items 133 express a predetermined shape by a set of object positions (analysis target points) in each image. The image data items 133 may be data items extracted from moving image data, or data items such as a drawn image which is different from the actual event.

The display mode setting data item 134 includes information on a range (an upper limit and a lower limit on an XY axis) and a scale resolution of an XY coordinate system that should be set according to an image display area of the display screen.

The RAM 12 is a volatile memory in which the information is temporarily stored, and the RAM 12 has a plurality of work areas in which various programs to be executed and data items relating to the various programs are stored. Specifically, the RAM 12 of the embodiment includes a movement type storage area 120, a designated point shape storage area 121, and a direction-change frequency storage area 122.

A movement type (kind) of the analysis target point illustrated by each image in the image file 132 through the information display processing (FIGS. 4 to 5) is stored in the movement type storage area 120. Examples of the movement type include a horizontal movement (such as spring movement and pendulum movement), a vertical movement (such as bound and free fall), and a rotational movement (such as circular movement and elliptical movement).

A shape of a designated point P, which is illustrated while overlapping the image in the information display processing (FIGS. 4 to 5), is stored in the designated point shape storage area 121.

A change frequency of a transition direction of the designated point P in the information display processing (FIGS. 4 to 5) is stored in the direction-change frequency storage area 122.

The CPU 11 centrally controls each unit of the scientific electronic calculator 1. Specifically, the CPU 11 expands a program, which is designated from the system program and various application programs stored in the storage unit 13, in the RAM 12 and executes various items of processing in cooperation with the program expanded in the RAM 12.

[1.3 Operation of Scientific Electronic Calculator]

An operation of the scientific electronic calculator 1 will be described below.

FIGS. 4 and 5 are flowcharts illustrating the operation of information display processing. When the user inputs an instruction to execute the information display processing through the touch panel 30 or the key input unit 14, the information display program 130 is read from the storage unit 13 and properly expanded in the RAM 12, whereby the information display processing is executed in cooperation between the information display program 130 and the CPU 11.

As illustrated in FIG. 4, in the information display processing, the CPU 11 determines whether or not the manipulation of reading one of the image files 132 from the storage unit 13 is performed (Step S1).

When the manipulation of reading one of the image files 132 from the storage unit 13 is performed (YES in Step S1), the CPU 11 designates one of the image files 132 as a designated image file 132S based on the user's manipulation (Step S2), and goes to Step S21.

When the manipulation of reading one of the image files 132 from the storage unit 13 is not performed (NO in Step S1), the CPU 11 determines whether or not the manipulation of reading the image file 132 from a server on the Internet is performed (Step S11). When the manipulation of reading the image file 132 from a server on the Internet is not performed (NO in Step S11), the CPU 11 goes to another processing.

When the manipulation of reading one of the image files 132 from the server is performed (YES in Step S11), the CPU 11 designates the movement type, which should be illustrated by the image, based on the user's manipulation while conducting communication with the server through the communication unit 16 (Step S12). Then the CPU 11 receives file names of the image files 132, in which the analysis target point that performs the movement of the designated type is included in the image, from the server and causes the display 3 to display a list of the file names (Step S13).

The CPU 11 designates one of the image files 132 as the designated image file 132S based on the user's manipulation (Step S14). The CPU 11 sets the movement type designated in Step S12 to the movement type of the image file 132 and stores the movement type in the movement type storage area 120 (Step S15). In the embodiment, the CPU 11 temporarily stores contents of the designated image file 132S in the RAM 12. Alternatively, the contents of the designated image file 132S may be stored while included in the image file group 131 of the storage unit 13.

The CPU 11 causes the display 3 to display an image of a head image data item 133 in the designated image file 132S (Step S21), and the CPU 11 determines whether or not the manipulation of starting the input of the designated point is performed (Step S22).

When the manipulation of starting the input of the designated point is not performed (NO in Step S22), the CPU 11 determines whether or not the manipulation of designating the movement type about the analysis target point in the image is performed (Step S51).

When the manipulation of designating the movement type about the analysis target point in the image is performed (YES in Step S51), the CPU 11 causes the display 3 to display "horizontal movement" (such as pendulum and a horizontal spring), "vertical movement" (such as bound and free fall), "rotational movement (such as a circle and an ellipse)", and "automatic detection" as options of the movement type about the analysis target point in the image, and the CPU 11 selects the movement type of one of the options based on the user's manipulation (Step S52). As used herein, the option of "automatic detection" means that the CPU 11 automatically detects the movement type. When the movement type is designated through Step S12, the CPU 11 automatically selects the same movement type, namely, the movement type, which is already stored in the movement type storage area 120, in Step S52.

After storing the selected movement type in the movement type storage area 120 (Step S53), and the CPU 11 goes to Step S22.

When the manipulation of designating the movement type about the analysis target point in the image is not performed (NO in Step S51), the CPU 11 determines whether or not the manipulation of designating the shape of the designated point is performed (Step S55). When the manipulation of designating the shape of the designated point is not performed (NO in Step S55), the CPU 11 goes to Step S22.

When the manipulation of designating the shape of the designated point is performed (YES in Step S55), the CPU 11 causes the display 3 to display an "x" mark, a "+" mark, an arrow mark, and a numerical mark as the options of the designated point shape, and the CPU 11 selects the designated point shape of one of the options based on the user's manipulation (Step S56). At this point, the designated point P of the shape of the arrow mark is illustrated while oriented toward the transition direction of the designated point P. The designated point P of the shape of the numerical mark illustrates a number (hereinafter referred to as a direction-change number) corresponding to the direction-change frequency of the direction-change frequency storage area 122.

After storing the selected designated point shape in the designated point shape storage area 121 (Step S57), and the CPU 11 goes to Step S22.

When the manipulation of starting the input of the designated point is performed (YES in Step S22), the CPU 11 stores "1" in the direction-change frequency storage area 122 (Step S23), and the CPU 11 receives the manipulation (touch manipulation) of inputting the designated point about the desired analysis target point in the image on the display screen on which the image of the image data item 133 is displayed (Step S24).

The CPU 11 causes the display 3 to display the designated point P of the shape stored in the designated point shape storage area 121 in black at a designated point position (the target position of the designated point input manipulation) (Step S25). At this point, when the designated point shape stored in the designated point shape storage area 121 is "numerical mark", the CPU 11 reads the direction-change frequency from the direction-change frequency storage area 122, and sets the shape of the designated point P to the shape of the corresponding number (direction-change number) of the direction-change frequency.

As illustrated in FIG. 5, while each already displayed designated point P is displayed, the CPU 11 switches the display target to an image of a next image data item 133 in the designated image file 132S to cause the display 3 to display the image of the next image data item 133 (Step S26). Then the CPU 11 receives the designated point input manipulation (touch manipulation) on the display screen (Step S27).

The CPU 11 determines whether or not the movement type stored in the movement type storage area 120 is "automatic detection" (Step S28). When the movement type stored in the movement type storage area 120 is not "automatic detection" (NO in Step S28), the CPU 11 goes to Step S41.

When the movement type stored in the movement type storage area 120 is "automatic detection" (YES in Step S28), the CPU 11 determines whether or not the transition direction of the designated point position is a substantially horizontal direction at the previous designated point position and the current designated point position (Step S31).

When the transition direction of the designated point position is the substantially horizontal direction at the previous designated point position and the current designated point position (YES in Step S31), the CPU 11 stores "horizontal movement" as the movement type in the movement type storage area 120 (Step S32), and goes to Step S41.

When the transition direction of the designated point position is not the substantially horizontal direction at the previous designated point position and the current designated point position (NO in Step S31), the CPU 11 determines whether or not the transition direction of the designated point position is a substantially vertical direction at the previous designated point position and the current designated point position (Step S33).

When the transition direction of the designated point position is the substantially vertical direction at the previous designated point position and the current designated point position (YES in Step S33), the CPU 11 stores "vertical movement" as the movement type in the movement type storage area 120 (Step S34), and goes to Step S41.

When the transition direction of the designated point position is not the substantially vertical direction at the previous designated point position and the current designated point position (NO in Step S33), the CPU 11 stores "rotational movement" as the movement type in the movement type storage area 120 (Step S35).

The CPU 11 fixes a color and the direction of the designated point according to the movement type (Step S41).

Figure 6:
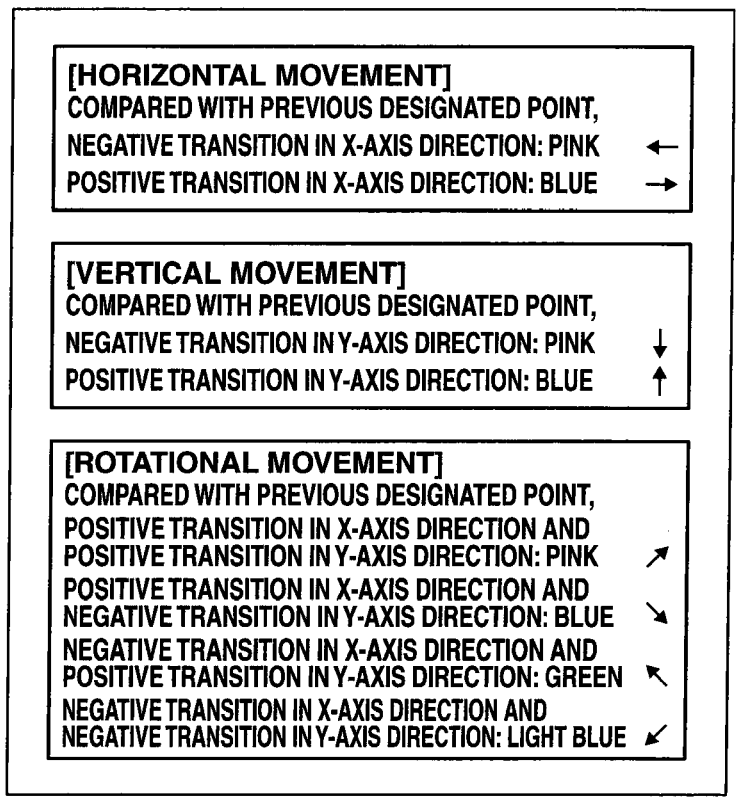
FIG. 6 is a view illustrating a relationship between a movement type and a color and a direction of a designated point.

Specifically, as illustrated in FIG. 6, when the current designated point position makes the negative transition in an X-axis direction (direction from the left toward the right of the display 3) while the movement type is "horizontal movement", the CPU 11 makes the currently displayed designated point P pink. At this point, when the designated point shape stored in the designated point shape storage area 121 is "arrow mark", the CPU 11 orients the currently displayed designated point P (arrow mark) toward the left.

When the current designated point position makes the positive transition in the X-axis direction while the movement type is "horizontal movement", the CPU 11 makes the currently displayed designated point P blue. At this point, when the designated point shape stored in the designated point shape storage area 121 is "arrow mark", the CPU 11 orients the currently displayed designated point P (arrow mark) toward the right.

When the current designated point position makes the negative transition in a Y-axis direction (direction from the bottom toward the top of the display 3) while the movement type is "vertical movement", the CPU 11 makes the currently displayed designated point P pink. At this point, when the designated point shape stored in the designated point shape storage area 121 is "arrow mark", the CPU 11 orients the currently displayed designated point P (arrow mark) toward a downward direction.

When the current designated point position makes the positive transition in the Y-axis direction while the movement type is "vertical movement", the CPU 11 makes the currently displayed designated point P blue. At this point, when the designated point shape stored in the designated point shape storage area 121 is "arrow mark", the CPU 11 orients the currently displayed designated point P (arrow mark) toward an upward direction.

When the current designated point position makes the positive transition in the X-axis direction and the positive transition in the Y-axis direction while the movement type is "rotational movement", the CPU 11 makes the currently displayed designated point P pink. At this point, when the designated point shape stored in the designated point shape storage area 121 is "arrow mark", the CPU 11 orients the currently displayed designated point P (arrow mark) toward an upper right direction.

When the current designated point position makes the positive transition in the X-axis direction and the negative transition in the Y-axis direction while the movement type is "rotational movement", the CPU 11 makes the currently displayed designated point P blue. At this point, when the designated point shape stored in the designated point shape storage area 121 is "arrow mark", the CPU 11 orients the currently displayed designated point P (arrow mark) toward a lower right direction.

When the current designated point position makes the negative transition in the X-axis direction and the positive transition in the Y-axis direction while the movement type is "rotational movement", the CPU 11 makes the currently displayed designated point P green. At this point, when the designated point shape stored in the designated point shape storage area 121 is "arrow mark", the CPU 11 orients the currently displayed designated point P (arrow mark) toward an upper left direction.

When the current designated point position makes the negative transition in the X-axis direction and the negative transition in the Y-axis direction while the movement type is "rotational movement", the CPU 11 makes the currently displayed designated point P light blue. At this point, when the designated point shape stored in the designated point shape storage area 121 is "arrow mark", the CPU 11 orients the currently displayed designated point P (arrow mark) toward a lower left direction.

Through Step S41, based on the movement type stored in the movement type storage area 120, the transition direction of the designated point P is detected on the display screen according to the order of the designated point input manipulation, and each designated point P after the change is fixed in the display mode different from that of the designated point P before the change every time the transition direction changes.

As illustrated in FIG. 5, the CPU 11 determines whether or not the transition direction changes based on whether or not the transition direction from the previous designated point P to the current designated point position is matched with the transition direction to the previous designated point P. When the transition direction changes, the CPU 11 adds "1" to the direction-change frequency in the direction-change frequency storage area 122 (Step S42). Therefore, the transition direction-change frequency is stored in the direction-change frequency storage area 122 when the new designated point P is displayed at the current designated point position. At this point, when the transition direction to the previous designated point P does not exist, the CPU 11 does not add the direction-change frequency, but keeps the direction-change frequency constant.

The CPU 11 causes the display 3 to display the designated point P having the color fixed in Step S41 at the current designated point position (Step S43). At this point, when the designated point shape stored in the designated point shape storage area 121 is "numerical mark", the CPU 11 reads the direction-change frequency from the direction-change frequency storage area 122, and sets the shape of the designated point P to the shape of the corresponding number (direction-change number) of the direction-change frequency. When the designated point shape stored in the designated point shape storage area 121 is "arrow mark", the CPU 11 sets the shape of the designated point P to the arrow shape having the orientation fixed in Step S41.

The CPU 11 determines whether or not the previous designated point P is displayed in black (Step S44). When the previous designated point P is not displayed in black (NO in Step S44), the CPU 11 goes to Step S47.

When the previous designated point P is displayed in black (YES in Step S44), the CPU 11 determines whether or not the movement type stored in the movement type storage area 120 is one of "horizontal movement" and "vertical movement" (Step S45). When the movement type is neither "horizontal movement" nor "vertical movement" (NO in Step S45), the CPU 11 goes to Step S47.

When the movement type is one of "horizontal movement" and "vertical movement" (YES in Step S45), the CPU 11 changes the previous designated point P to the same color as the current designated point P (Step S46).

The CPU 11 determines whether or not a next image data item 133 exists in the designated image file 132S (Step S47). When the next image data item 133 exists in the designated image file 132S (YES in Step S47), the CPU 11 goes to Step S26.

When the next image data item 133 does not exist in the designated image file 132S (NO in Step S47), the CPU 11 determines whether or not the manipulation of displaying the series of designated points of the currently displayed designated point P is performed (Step S48). When the manipulation of displaying the series of designated points of the currently displayed designated point P is not performed (NO in Step S48), the CPU 11 goes to another processing.

When the manipulation of displaying the series of designated points of the currently displayed designated point P is performed (YES in Step S48), the CPU 11 causes the display 3 to display an image in which the designated points P overlap one another in a left area of the display 3, and causes the display 3 to display the series of designated points P (a view in which a horizontal axis indicates an image capturing time while a vertical axis indicates the designated point position in the X-axis direction (or Y-axis direction)) in a right area of the display 3 (Step S49). Then the CPU 11 ends the information display processing.

[1.4 Operation Examples]

The operation of the scientific electronic calculator 1 will specifically be described below with reference to the drawings.

Operation Example 1

The user performs the manipulation of reading one of the image files 132 from the storage unit 13 (YES in Step S1), and the image file 132 of the pendulum illustrated on the left of FIG. 3A is designated. Therefore, the image file 132 is designated as the designated image file 132S (Step S2).

Figure 7A:
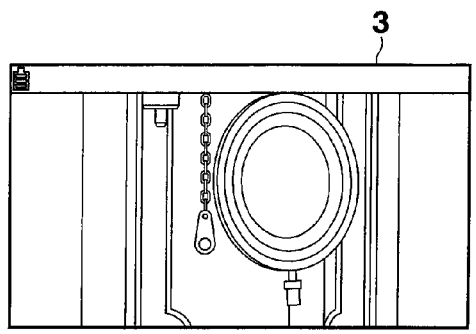
FIGS. 7A, 7B, 7C, 7D, and 7E are views illustrating display contents of a display.
Figure 7D:
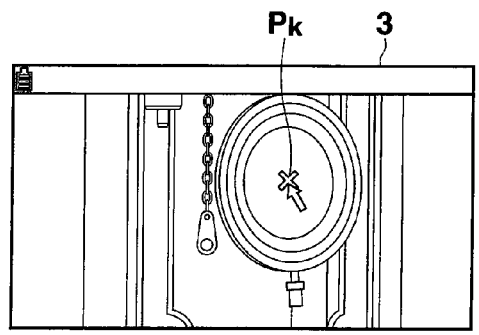
Figure 7B:
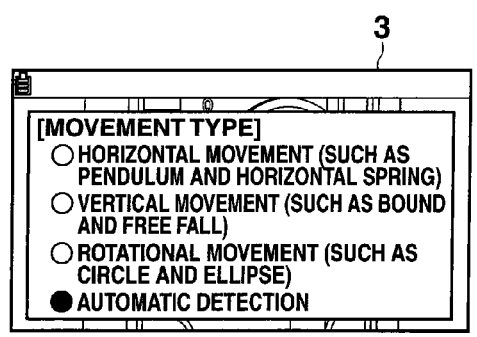

As illustrated in FIG. 7A, the image of the head image data item 133 in the designated image file 132S is displayed on the display 3 (Step S21), and the user performs the manipulation of designating the movement type of the analysis target point in the image (YES in Step S51). Therefore, as illustrated in FIG. 7B, "horizontal movement" (such as pendulum and horizontal spring), "vertical movement" (such as bound and free fall), "rotational movement" (such as circle and ellipse), and "automatic detection" are displayed as the options of the movement type.

Figure 7E:
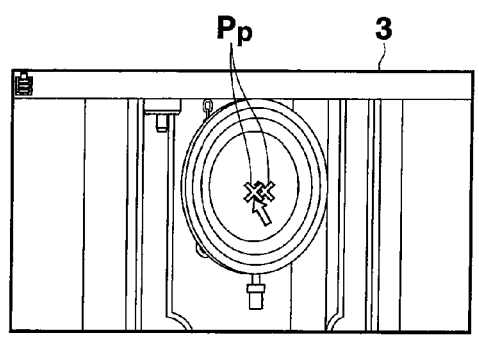
Figure 7C:
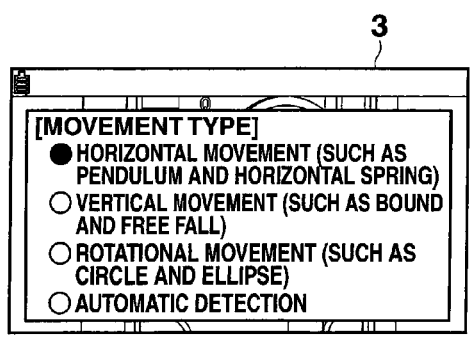

As illustrated in FIG. 7C, when the user selects the movement type of "horizontal movement" (Step S52), the selected movement type of "horizontal movement" is stored in the movement type storage area 120 (Step S53).

When the user performs the manipulation of starting the designated point input manipulation (YES in Step S22), "1" is stored in the direction-change frequency storage area 122 (Step S23). Then, as illustrated in FIG. 7D, the designated point input manipulation (touch manipulation) of the desired analysis target point (in this case, the center of the pendulum) in the image is received on the display screen on which the image of the image data item 133 is displayed (Step S24).

When the user performs the designated point input manipulation, a designated point Pk having the shape (in this case, the "x" mark) stored in the designated point shape storage area 121 is displayed in black at the designated point position (the target position of the designated point input manipulation) (Step S25). In the operation example 1, a suffix "k" to a symbol "P" of the designated point P indicates that the designated point P is displayed in black. Similarly, suffixes "p", "b", "g", and "lb" to the symbol "P" of the designated point P indicate that the designated point P is displayed in pink, blue, green, and light blue, respectively.

The image of the next image data item 133 in the designated image file 132S is displayed while the display of the already displayed designated point Pk is maintained (Step S26), and the designated point input manipulation (touch manipulation) is received on the display screen (Step S27).

When the user performs the designated point input manipulation, the determination that the current designated point position makes the negative transition in the X-axis direction compared with the previous designated point position while the movement type is "horizontal movement" is made, and the color of the currently displayed designated point P is fixed to pink (Step S41).

As illustrated in FIG. 7E, the designated point Pp having the color (pink) fixed in Step S41 is displayed at the current designated point position (Step S43), the determination that the previous designated point Pk is displayed in black is made (YES in Step S44), and the previous designated point Pk is changed to the same color (pink) as the current designated point Pp (Step S46).

The determination that the next image data item 133 exists in the designated image file 132S (YES in Step S47), the image of the next image data item 133 in the designated image file 132S is displayed while the display of the already displayed designated point P is maintained (Step S26), and the designated point input manipulation (touch manipulation) is received on the display screen (Step S27).

Figure 8A:
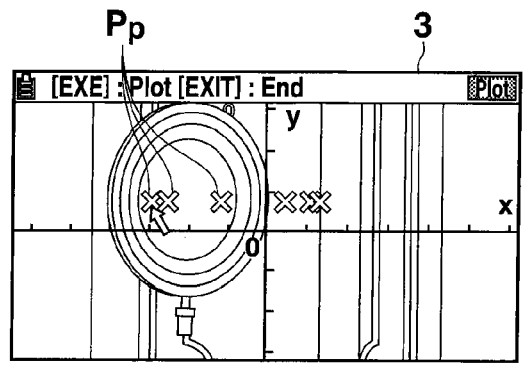
FIGS. 8A, 8B, 8C, and 8D are views illustrating display contents of a display.

As illustrated in FIG. 8A, similarly the user performs the designated point input manipulation, and the determination that the current designated point position makes the negative transition in the X-axis direction compared with the previous designated point position while the movement type is "horizontal movement" is made. Therefore, the color of the currently displayed designated point P is fixed to pink (Step S41), and the designated point P having the fixed color (pink) is displayed at the current designated point position (Step S43).

Figure 8B:
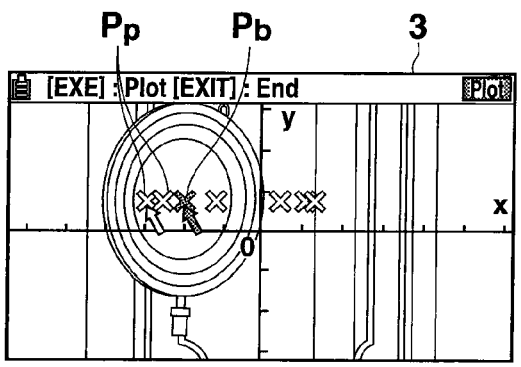

On the other hand, as illustrated in FIG. 8B, the user performs the designated point input manipulation, the determination that the current designated point position makes the positive transition in the X-axis direction compared with the previous designated point position while the movement type is "horizontal movement" is made, the color of each displayed designated point P is fixed to blue (Step S41), and the designated point P having the fixed color (blue) is displayed at the current designated point position (Step S43). In FIG. 8B, the blue designated point Pb is displayed by hatching.

Figure 8C:
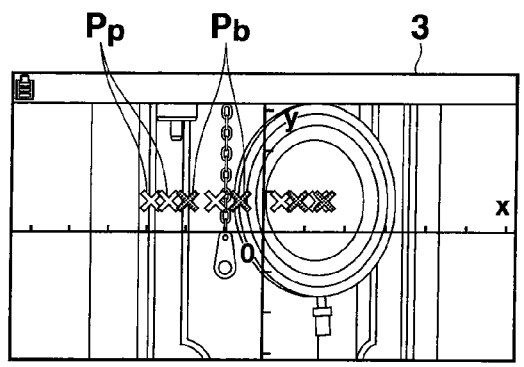

As illustrated in FIG. 8C, similarly the user performs the designated point input manipulation, and the determination that the current designated point position makes the positive transition in the X-axis direction compared with the previous designated point position while the movement type is "horizontal movement" is made. Therefore, the color of each displayed designated point P is fixed to blue (Step S41), and the designated point P having the fixed color (blue) is displayed at the current designated point position (Step S43).

Figure 8D:
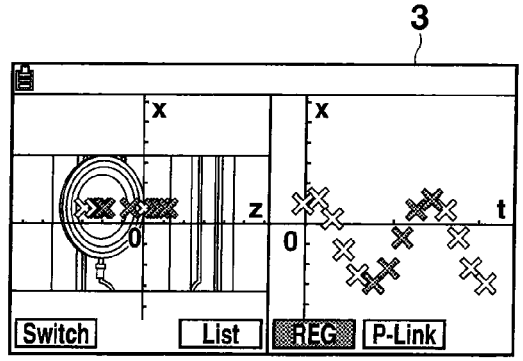

The determination that the next image data item 133 does not exist in the designated image file 132S is made (NO in Step S47), and the user performs the manipulation of displaying the series of the currently displayed designated points P (YES in Step S48). Therefore, as illustrated in FIG. 8D, the image in which the designated points P overlap one another is displayed in the left area of the display 3 while the series of designated points P is displayed in the right area of the display 3 (Step S49).

Operation Example 2

Figure 9A:
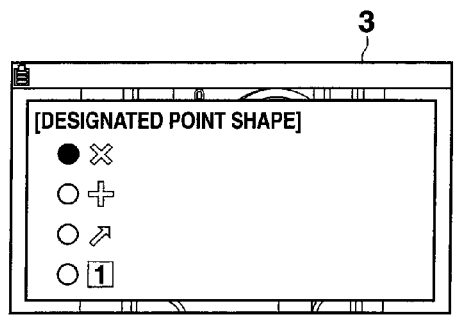
FIGS. 9A, 9B, 9C, 9D, and 9E are views illustrating display contents of a display.

When the user performs the manipulation of designating the designated point shape after the state illustrated in FIG. 7C (YES in Step S55), the "x" mark, the "+" mark, the arrow mark, and the numerical mark are displayed as the options of the designated point shape as illustrated in FIG. 9A. When the user selects the designated point shape of the numerical mark (Step S56), the selected designated point shape of the "numerical mark" is stored in the designated point shape storage area 121 (Step S57).

Figure 9B:
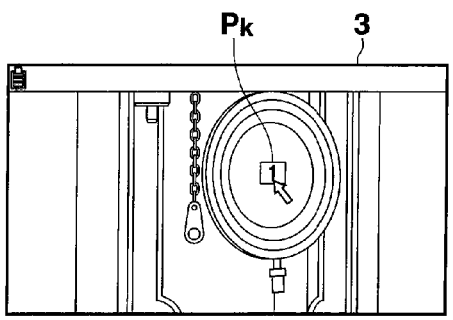

When the user performs the manipulation of starting the designated point input manipulation (YES in Step S22), "1" is stored in the direction-change frequency storage area 122 (Step S23). Then, as illustrated in FIG. 9B, the designated point input manipulation (touch manipulation) of the desired analysis target point (in this case, the center of the pendulum) in the image is received on the display screen on which the image of the image data item 133 is displayed (Step S24).

When the user performs the designated point input manipulation, the designated point P having the shape (in this case, the numerical mark) stored in the designated point shape storage area 121 is displayed in black at the designated point position (the target position of the designated point manipulation) (Step S25). More particularly, the direction-change frequency of "1" is read from the direction-change frequency storage area 122, and the shape of the designated point P is set to the corresponding number of "1" of the direction-change frequency.

Figure 9C:
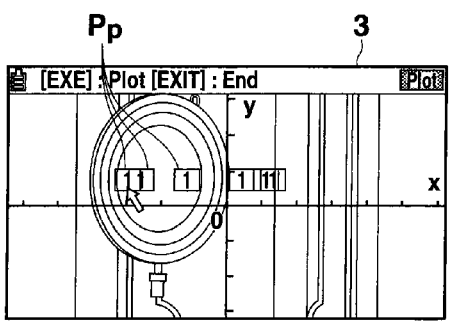

As illustrated in FIG. 9C, the image of the next image data item 133 in the designated image file 132S is displayed while the display of the already displayed designated point Pk is maintained (Step S26), and the designated point input manipulation (touch manipulation) is received on the display screen (Step S27).

When the user performs the designated point input manipulation, the determination that the current designated point position makes the negative transition in the X-axis direction compared with the previous designated point position while the movement type is "horizontal movement" is made, and the color of the currently displayed designated point P is fixed to pink (Step S41). At this point, because the transition direction to the previous designated point Pk does not exist, the direction-change frequency in the direction-change frequency storage area 122 is maintained at "1" (Step S42).

The designated point P having the color (pink) fixed in Step S41 is displayed at the current designated point position (Step S43), the determination that the previous designated point Pk is displayed in black is made (YES in Step S44), and the previous designated point Pk is changed to the same color (pink) as the current designated point Pp (Step S46).

The determination that the next image data item 133 exists in the designated image file 132S is made (YES in Step S47), the image of the next image data item 133 in the designated image file 132S is displayed while the display of the already displayed designated point P is maintained (Step S26), and the designated point input manipulation (touch manipulation) is received on the display screen (Step S27).

Similarly, when the user performs the designated point input manipulation, the determination that the current designated point position makes the negative transition in the X-axis direction compared with the previous designated point position while the movement type is "horizontal movement" is made. Therefore, the color of each displayed designated point P is fixed to pink (Step S41), and the designated point P having the fixed color (pink) is displayed at the current designated point position (Step S43).

Figure 9D:
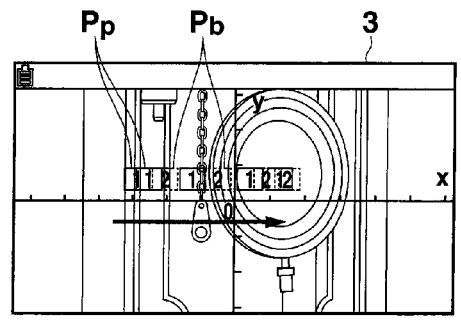

On the other hand, as illustrated in FIG. 9D, when the user performs the designated point input manipulation, the determination that the current designated point position makes the positive transition in the X-axis direction compared with the previous designated point position while the movement type is "horizontal movement" is made, and the color of the currently displayed designated point P is fixed to blue (Step S41).

The determination that the transition direction changes is made based on whether or not the transition direction (right) from the previous designated point P to the current designated point position is matched with the transition direction (left) to the previous designated point P, and the direction-change frequency in the direction-change frequency storage area 122 is set to "2" (Step S42), and the designated point P having the color (blue) fixed in Step S41 is displayed at the current designated point position (Step S43). In FIG. 9D, the blue designated point Pb is illustrated by hatching.

Similarly, when the user performs the designated point input manipulation, the determination that the current designated point position makes the positive transition in the X-axis direction compared with the previous designated point position while the movement type is "horizontal movement" is made, the color of the currently displayed designated point P is fixed to blue (Step S41), and the designated point P having the fixed color (blue) is displayed at the current designated point position (Step S43).

Figure 9E:
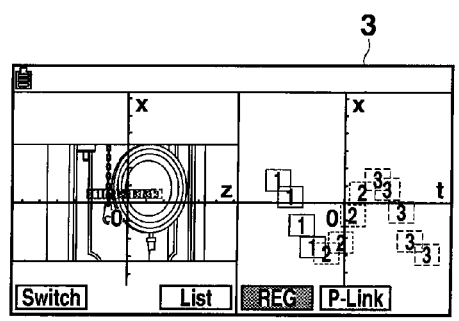

The determination that the next image data item 133 does not exist in the designated image file 132S (NO in Step S47), and the user performs the manipulation of displaying the series of currently displayed designated points P (YES in Step S48). Therefore, as illustrated in FIG. 9E, the image in which the designated points P overlap one another is displayed in the left area of the display 3 while the series of designated points P is displayed in the right area of the display 3 (Step S49).

Operation Example 3

Figure 10A:
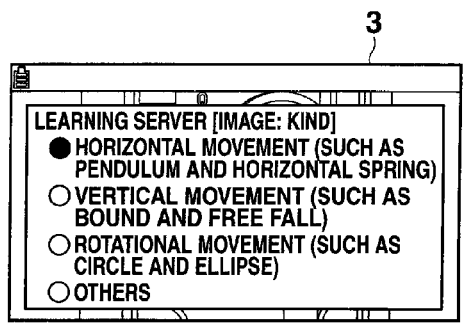
FIGS. 10A, 10B, 10C, 10D, 10E, and 10F are views illustrating display contents of the display.

When the user performs the manipulation of reading the image file 132 from the server (YES in Step S11), the CPU 11 conducts communication with the server, and the list of movement types that should be illustrated by the image is displayed on the display 3 as illustrated in FIG. 10A.

Figure 10D:
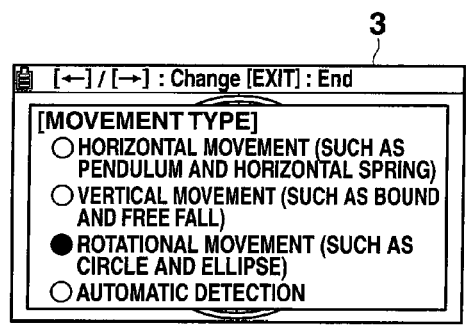
Figure 10B:
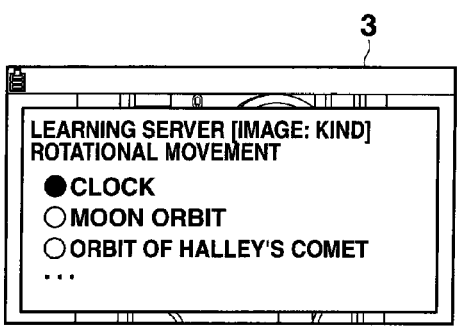

When the user designates "rotational movement" (Step S12), the list of file names of the image file 132 corresponding to the movement type is displayed on the display 3 as illustrated in FIG. 10B (Step S13). The image files such as "pendulum moving image" illustrated on the left of FIG. 3B are stored as the image file 132 corresponding to the movement type of "horizontal movement" in the server, the image files such as "spring moving image" illustrated in the center of FIG. 3B are stored as the image file 132 corresponding to the movement type of "vertical movement" in the server, and the image files such as "clock moving image" illustrated on the right of FIG. 3B are stored as the image file 132 corresponding to the movement type of "rotational movement" in the server.

When the user designates the image file 132 of "clock" as the designated image file 132S (Step S14), the movement type of "rotational movement" designated in Step S12 is stored as the movement type of the image file 132 in the movement type storage area 120 (Step S15).

As illustrated in FIG. 100, the image of the head image data item 133 in the designated image file 132S is displayed on the display 3 (Step S21), and the user performs the manipulation of designating the movement type of the analysis target point for confirmation (YES in Step S51). Therefore, as illustrated in FIG. 10D, "horizontal movement" (such as pendulum and horizontal spring), "vertical movement" (such as bound and free fall), "rotational movement" (such as circle and ellipse), and "automatic detection" are displayed as the options of the movement type, "rotational movement" is selected, and the selected movement type of "rotational movement" is stored in the movement type storage area 120 again (Step S53).

Figure 10E:
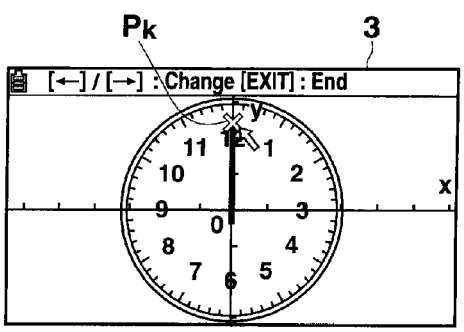
Figure 10C:
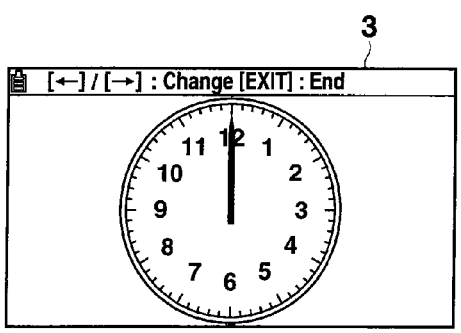

When the user performs the manipulation of starting the designated point input manipulation (YES in Step S22), "1" is stored in the direction-change frequency storage area 122 (Step S23). Then, as illustrated in FIG. 10E, the designated point input manipulation (touch manipulation) of the desired analysis target point (in this case, a leading end of a minute hand) in the image is received on the display screen on which the image of the image data item 133 is displayed (Step S24).

When the user performs the designated point input manipulation, the designated point Pk having the shape (in this case, the "x" mark) stored in the designated point shape storage area 121 is displayed in black at the designated point position (the target position of the designated point manipulation) (Step S25).

Figure 10F:
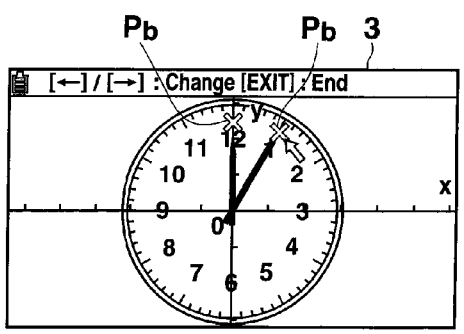

As illustrated in FIG. 10F, the image of the next image data item 133 in the designated image file 132S is displayed while the display of the already displayed designated point Pk is maintained (Step S26), and the designated point input manipulation (touch manipulation) is received on the display screen (Step S27).

When the user performs the designated point input manipulation, the determination that the current designated point position makes the positive transition in the X-axis direction and the negative transition in the Y-axis direction compared with the previous designated point position while the movement type is "rotational movement" is made, and the color of the currently displayed designated point P is fixed to blue (Step S41).

The designated point P having the color (blue) fixed in Step S41 is displayed at the current designated point position (Step S43), the determination that the previous designated point Pk is displayed in black is made (YES in Step S44), and the previous designated point Pk is changed to the same color (blue) as the current designated point Pb (Step S46).

The determination that the next image data item 133 exists in the designated image file 132S is made (YES in Step S47), the image of the next image data item 133 in the designated image file 132S is displayed while the display of the already displayed designated point P is maintained (Step S26), and the designated point input manipulation (touch manipulation) is received on the display screen (Step S27).

Figure 11A:
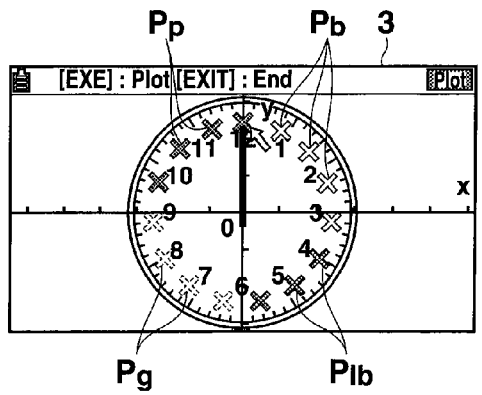
FIGS. 11A, 11B, 11C, 11D, and 11E are views illustrating display contents of the display.

Similarly, as illustrated in FIG. 11A, when the user performs the designated point input manipulation to make the determination that the current designated point position makes the positive transition in the X-axis direction and the positive transition in the Y-axis direction compared with the previous designated point position, the color of each displayed designated point P is fixed to pink (Step S41). When the determination that the current designated point position makes the positive transition in the X-axis direction and the negative transition in the Y-axis direction compared with the previous designated point position is made, and the color of the currently displayed designated point P is fixed to blue. When the determination that the current designated point position makes the negative transition in the X-axis direction and the positive transition in the Y-axis direction compared with the previous designated point position is made, and the color of the currently displayed designated point P is fixed to green. When the determination that the current designated point position makes the negative transition in the X-axis direction and the negative transition in the Y-axis direction compared with the previous designated point position is made, and the color of the currently displayed designated point P is fixed to light blue (Step S41).

The designated point P having the fixed color is displayed at the current designated point position (Step S43).

The determination that the next image data item 133 does not exist in the designated image file 132S (NO in Step S47), and the user performs the manipulation of displaying the series of the currently displayed designated points P (YES in Step S48). Therefore, as illustrated in FIGS. 11B and 11C, the image in which the designated points P overlap one another is displayed in the left area of the display 3 while the series of designated points P is displayed in the right area of the display 3 (Step S49).

Figure 11D:
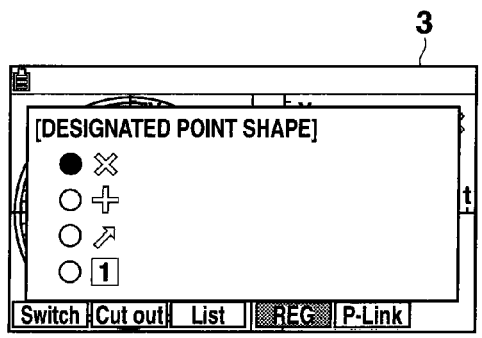
Figure 11B:
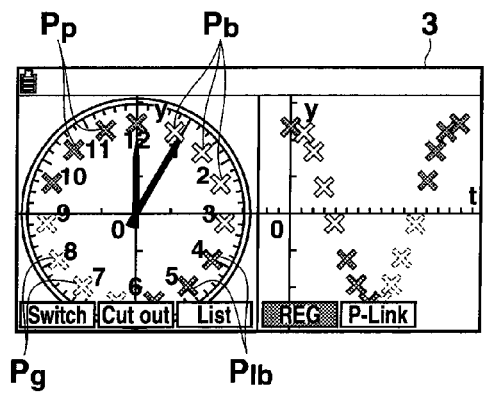

When the user performs the manipulation of designating the designated point shape after the state illustrated in FIG. 10D (YES in Step S55), the "x" mark, the "+" mark, the arrow mark, and the numerical mark are displayed as the options of the designated point shape as illustrated in FIG. 11D. When the user selects the designated point shape of the arrow mark (Step S56), the selected designated point shape of the "arrow mark" is stored in the designated point shape storage area 121 (Step S57).

Figure 11E:
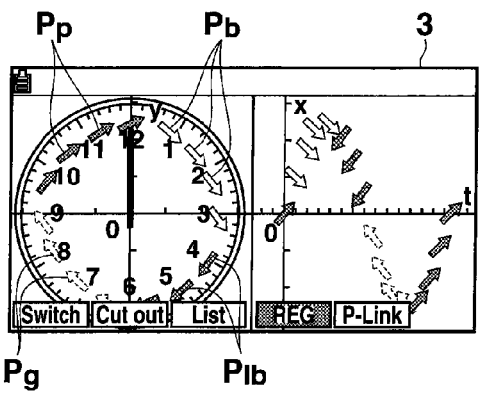
Figure 11C:
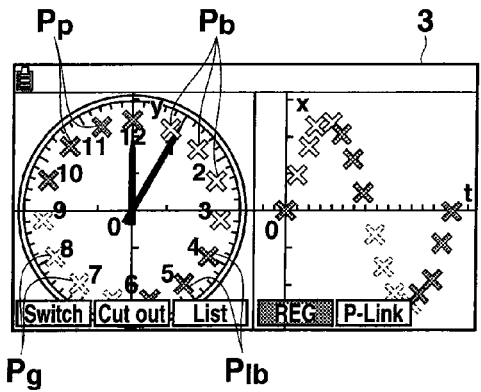

After the designated point input manipulation is performed similarly to FIGS. 10E to 11A, when the user performs the manipulation of displaying the series of designated points P (YES in Step S48), the image of the arrow mark in which the designated points P overlap one another is displayed in the left area of the display 3 while the series of designated points P is displayed in the right area of the display 3 as illustrated in FIG. 11E (Step S49).

Operation Example 4

The user performs the manipulation of reading one of the image files 132 from the storage unit 13 (YES in Step S1), and designates the image file 132 of "ball moving image" illustrated on the right of FIG. 3A. Therefore, the image file 132 is designated as the designated image file 132S (Step S2).

Figure 12A:
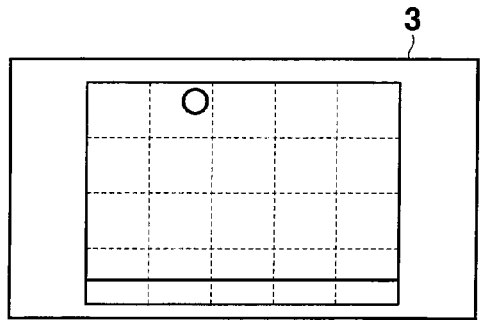
FIGS. 12A, 12B, 12C, 12D, 12E, 12F, and 12G are views illustrating display contents of the display.
Figure 12E:
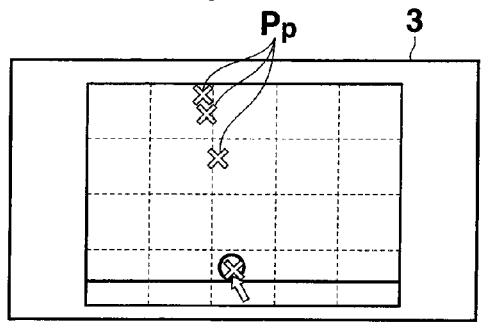
Figure 12B:
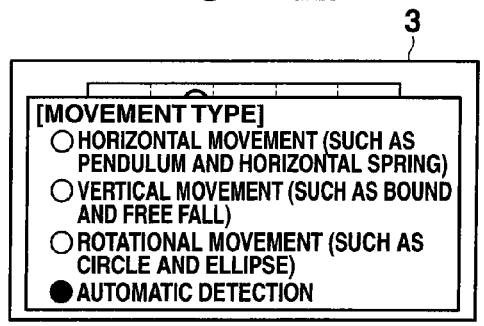

As illustrated in FIG. 12A, the image of the head image data item 133 in the designated image file 132S is displayed on the display 3 (Step S21), and the user performs the manipulation of designating the movement type of the analysis target point in the image (YES in Step S51). Therefore, as illustrated in FIG. 12B, "horizontal movement" (such as pendulum and horizontal spring), "vertical movement" (such as bound and free fall), "rotational movement" (such as circle and ellipse), and "automatic detection" are displayed as the options of the movement type.

When the user selects the movement type of "automatic detection" (Step S52), the selected movement type of "automatic detection" is stored in the movement type storage area 120 again (Step S53).

When the user performs the manipulation of starting the designated point input manipulation (YES in Step S22), "1" is stored in the direction-change frequency storage area 122 (Step S23). Then, as illustrated in FIG. 12C, the designated point input manipulation (touch manipulation) of the desired analysis target point (in this case, the position of the ball) in the image is received on the display screen on which the image of the image data item 133 is displayed (Step S24).

When the user performs the designated point input manipulation, the designated point Pk having the shape (in this case, the "x" mark) stored in the designated point shape storage area 121 is displayed in black at the designated point position (the target position of the designated point manipulation) (Step S25).

The image of the next image data item 133 in the designated image file 132S is displayed while the display of the already displayed designated point Pk is maintained (Step S26), and the designated point input manipulation (touch manipulation) is received on the display screen (Step S27).

When the user performs the designated point input manipulation, the determination that the movement type stored in the movement type storage area 120 is "automatic detection" is made (YES in Step S28), the determination that the transition direction of the designated point position is the substantially vertical direction at the previous designated point position and the current designated point position is made (YES in Step S33), and the movement type of "vertical movement" is stored in the movement type storage area 120 (Step S34).

The determination that the current designated point position makes the negative transition in the Y-axis direction compared with the previous designated point position while the movement type is "vertical movement" is made, and the color of the currently displayed designated point P is fixed to pink (Step S41).

Figure 12F:
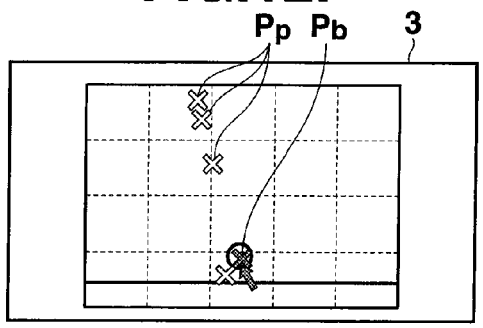
Figure 12C:
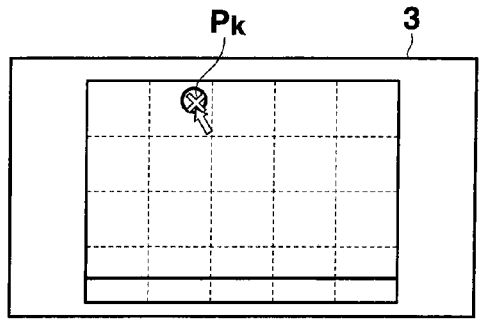
Figure 12G:
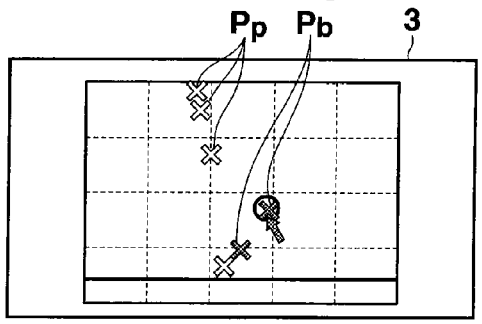
Figure 12D:
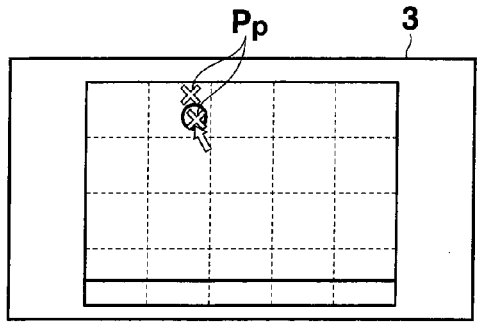

As illustrated in FIG. 12D, the designated point Pp having the color (pink) fixed in Step S41 is displayed at the current designated point position (Step S43), the determination that the previous designated point Pk is displayed in black is made (YES in Step S44), and the previous designated point Pk is changed to the same color (pink) as the current designated point Pp (Step S46).

The determination that the next image data item 133 exists in the designated image file 132S (YES in Step S47), the image of the next image data item 133 in the designated image file 132S is displayed while the display of the already displayed designated point P is maintained (Step S26), and the designated point input manipulation (touch manipulation) is received on the display screen (Step S27).

As illustrated in FIG. 12D, similarly, when the user performs the designated point input manipulation to make the determination that the current designated point position makes the negative transition in the Y-axis direction compared with the previous designated point position while the movement type is "vertical movement", the color of each displayed designated point P is fixed to pink (Step S41), and the designated point P having the fixed color (pink) is displayed at the current designated point position (Step S43).

On the other hand, as illustrated in FIG. 12F, when the user performs the designated point input manipulation, the determination that the current designated point position makes the positive transition in the Y-axis direction compared with the previous designated point position while the movement type is "vertical movement" is made, the color of each displayed designated point P is fixed to blue (Step S41), and the designated point P having the fixed color (blue) is displayed at the current designated point position (Step S43).

As illustrated in FIG. 12G, similarly, when the user performs the designated point input manipulation to make the determination that the current designated point position makes the positive transition in the X-axis direction compared with the previous designated point position while the movement type is "vertical movement", and the color of each displayed designated point P is fixed to blue (Step S41), and the designated point P having the fixed color (blue) is displayed at the current designated point position (Step S43).

As described above, according to the embodiment, as illustrated in Step S41 of FIG. 5 or FIG. 6 and FIGS. 7A to 12G, when the user performs the designated point input manipulation of the desired analysis target point in an image of one of the image data items 133 on the display screen in the state in which the image is displayed, the display-controlled image data items 133 are sequentially switched in the designated image file 132S while the designated point P is displayed and maintained at the target position of the designated point input manipulation in the display screen according to the designated point input manipulation, the transition direction of the designated point P is detected on the display screen in the order of the designated point input manipulation, and each designated point P after the change is displayed in the display mode different from that of the designated point P before the change every time the transition direction changes. Therefore, even if the analysis target point passes through the same position a plurality of times to overlap the designated point, the visualization of movement destination of the designated point can be facilitated.

As illustrated in Steps S12 to S15 of FIG. 4 or FIGS. 10A to 10F, the image file 132 in which the analysis target point performing the selected kind of the movement is included in each image is obtained from the server and designated as the designated image file 132S. In this case, the kind of the movement selected by the user can securely be matched with the kind of the movement illustrated by each image of the designated image file 132S. Accordingly, the false selection of the movement type can be prevented.

As illustrated in Step S42 of FIG. 5 or FIGS. 9A to 9E, when the designated point input manipulation is performed, the change frequency of the transition direction is detected while the new designated point P is displayed at the target position of the designated point input manipulation, and the number corresponding to the change frequency is displayed while included in the new designated point P, so that the visualization of the movement destination and the change frequency of the designated point can be facilitated.

The detailed configuration and the detailed operation of each component constituting the scientific electronic calculator 1 in the embodiment can properly be changed without departing from the scope of the invention.

For example, the information display apparatus according to the invention is described as the scientific electronic calculator 1. However, the invention is not limited to the scientific electronic calculator 1, but the invention can be applied to general electronic devices such as a mobile phone, a personal computer, a PDA (Personal Digital Assistant), and a game machine. The information display program 130 according to the invention may be stored in the external information storage medium 4a that is detachably attached to the scientific electronic calculator 1.

In the embodiment, the number corresponding to the direction-change frequency is displayed while included in the new designated point P. Alternatively, the new designated point P is displayed in a darker color with increasing direction-change frequency. In this case, the visualization of the movement destination and the movement frequency of the designated point can be facilitated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information display apparatus comprising:
    an image file storage unit which stores an image file including a series of image data items each containing an analysis target point of a moving object;
    a subsequent image display control unit which, when an image corresponding to one of the series of image data items of the image file is displayed on a display screen and a specified position in the displayed image is specified based on an input by a user to correspond to the analysis target point in the image, displays a subsequent image corresponding to a subsequent one of the series of image data items on the display screen;
    a specified direction determination unit which, each time a subsequent image is displayed by the subsequent image display control unit and another specified position is specified in the subsequent image based on an input by a user, determines a transition direction from a previously specified position to a presently specified position;
    a direction-change determination unit which determines whether or not there is a change between a current transition direction and a previous transition direction determined by the specified direction determination unit;
    a direction-change frequency update unit which updates direction-change frequency data indicating a direction-change frequency when the direction-change determination unit determines the change;
    a specified position display mode control unit which sets a display mode for each specified position and which, each time the transition direction determined by the specified direction determination unit changes, changes the display mode such that a specified position that was specified after the change has a different display mode from a display mode of a specified position that was specified before the change, wherein each display mode uses a number corresponding to the direction-change frequency;
    a graph display control unit which displays a graph representing movement between a plurality of specified positions that have been specified in images corresponding to the series of image data items of the image file, such that each of the specified positions is displayed in the display mode set for the specified position by the specified position display mode control unit; and
    a changed number display control unit which sets the display mode for a specified position such that a number corresponding to the direction-change frequency is displayed in a shape which is predetermined as a shape for the number.

2. The information display apparatus according to claim 1, further comprising a movement kind selection unit which selects one of a horizontal movement, a vertical movement, and a rotational movement as a movement kind of each analysis target point based on the user's manipulation,
    wherein the specified direction determination unit determines the transition direction of any one of the horizontal movement, vertical movement, and rotational movement, based on the movement kind selected by the movement kind selection unit.

3. The information display apparatus according to claim 2, further comprising an image file obtaining unit which obtains the image file, in which the analysis target point performing the movement of the kind selected by the movement kind selection unit is included in each of the series of image data items, from an external device and stores the image file in the image file storage unit.

4. The information display apparatus according to claim 1, wherein the specified position display mode control unit sets the display mode for each specified position such that each specified position is displayed in a color that becomes darker after each change in the transition direction determined by the specified direction determination unit.

5. An information display method for use in an information display apparatus equipped with an image file storage unit storing an image file including a series of image data items each containing an analysis target point of a moving object, the method comprising:
    when an image corresponding to one of the series of image data items of the image file is displayed on a display screen and a specified position in the displayed image is specified based on an input by a user to correspond to the analysis target point in the image, displaying a subsequent image corresponding to a subsequent one of the series of image data items on the display screen;
    each time a subsequent image is displayed and another specified position is specified in the subsequent image based on an input by a user, determining a transition direction from a previously specified position to a presently specified position;
    determining whether or not there is a change between a current determined transition direction and a previous determined transition direction;
    updating direction-change frequency data indicating a direction-change frequency when the change is determined;
    setting a display mode for each specified position and, each time the transition direction changes, changing the display mode such that a specified position that was specified after the change has a different display mode from a display mode of a specified position that was specified before the change, wherein each display mode uses a number corresponding to the direction-change frequency;
    displaying a graph representing movement between a plurality of specified positions that have been specified in images corresponding to the series of image data items of the image file, such that each of the specified positions is displayed in the display mode set for the specified position; and
    setting the display mode for a specified position such that a number corresponding to the direction-change frequency is displayed in a shape which is predetermined as a shape for the number.

6. A non-transitory computer-readable storage medium having program code stored thereon for controlling an information display apparatus equipped with an image file storage unit storing an image file including a series of image data items each containing an analysis target point of a moving object, the program code causing a computer of the information display apparatus to perform functions comprising:

when an image corresponding to one of the series of image data items of the image file is displayed on a display screen and a specified position in the displayed image is specified based on an input by a user to correspond to the analysis target point in the image, displaying a subsequent image corresponding to a subsequent one of the series of image data items on the display screen;

each time a subsequent image is displayed and another specified position is specified in the subsequent image based on an input by a user, determining a transition direction from a previously specified position to a presently specified position;

determining whether or not there is a change between a current determined transition direction and a previous determined transition direction;

updating direction-change frequency data indicating a direction-change frequency when the change is determined;

setting a display mode for each specified position and, each time the transition direction changes, changing the display mode such that a specified position that was specified after the change has a different display mode from a display mode of a specified position that was specified before the change, wherein each display mode uses a number corresponding to the direction-change frequency;

displaying a graph representing movement between a plurality of specified positions that have been specified in images corresponding to the series of image data items of the image file, such that each of the specified positions is displayed in the display mode set for the specified position; and setting the display mode for a specified position such that a number corresponding to the direction-change frequency is displayed in a shape which is predetermined as a shape for the number.

* * * * *